US012728581B2

(12) United States Patent
Sohm et al.

(10) Patent No.: US 12,728,581 B2
(45) Date of Patent: Sep. 8, 2026

(54) METHOD AND DEVICE FOR LOADING A FIBRE-BASED CONTAINER WITH A PREFORM AND FOR INSERTING THE CONTAINER INTO A BLOW MOLD

(71) Applicant: ALPLA Werke Alwin Lehner GmbH & Co. KG, Hard (AT)

(72) Inventors: Alexander Sohm, Dornbirn (AT); Adem Demir, Lauterach (AT)

(73) Assignee: ALPLA Werke Alwin Lehner GmbH & Co. KG, Hard (AT)

( * ) Notice: Subject to any disclaimer, the term of this patent is extended or adjusted under 35 U.S.C. 154(b) by 139 days.

(21) Appl. No.: 18/682,765

(22) PCT Filed: Aug. 10, 2022

(86) PCT No.: PCT/EP2022/072407
§ 371 (c)(1),
(2) Date: Feb. 9, 2024

(87) PCT Pub. No.: WO2023/017065
PCT Pub. Date: Feb. 16, 2023

(65) Prior Publication Data

US 2024/0424724 A1 Dec. 26, 2024

(30) Foreign Application Priority Data

Aug. 11, 2021 (CH) ................................ 70150/2021

(51) Int. Cl.

| | |
|---|---|
| ***B29C 49/42*** | (2006.01) |
| ***B29C 49/20*** | (2006.01) |
| *B29C 49/24* | (2006.01) |
| *B29L 31/00* | (2006.01) |

(52) U.S. Cl.
CPC ........ *B29C 49/42119* (2022.05); *B29C 49/20* (2013.01); *B29C 49/42073* (2022.05);
(Continued)

(58) Field of Classification Search
CPC .............. B29C 49/42073; B29C 49/20; B29C 49/42119; B29C 49/24; B29C 49/42101;
(Continued)

(56) References Cited

U.S. PATENT DOCUMENTS

| | | |
|---|---|---|
| 3,893,882 A | 7/1975 | Repenning |
| 2011/0127141 A1 | 6/2011 | Zoppas et al. |

FOREIGN PATENT DOCUMENTS

| | | |
|---|---|---|
| CH | 120320 | 5/1927 |
| EP | 3 375 593 B1 | 9/2018 |

(Continued)

OTHER PUBLICATIONS

International Search Report corresponding to PCT/EP2022/072407 mailed Nov. 7, 2022.

(Continued)

*Primary Examiner* — Monica A Huson
(74) *Attorney, Agent, or Firm* — Secant IP, P.L.L.C.

(57) ABSTRACT

The invention relates to a device and a method for loading a fiber-based container (20) with a preform (30), comprising the following steps:
providing a container (20) on a rotary plate (40);
rotating the rotary plate (40) together with the container (20) into a predetermined position;
inserting a preform (30) into the container (20); the invention also relates to a method for inserting a fiber-based container (20), together with a preform (30) arranged therein, into a blow mold (80).

20 Claims, 4 Drawing Sheets

Figure 1:
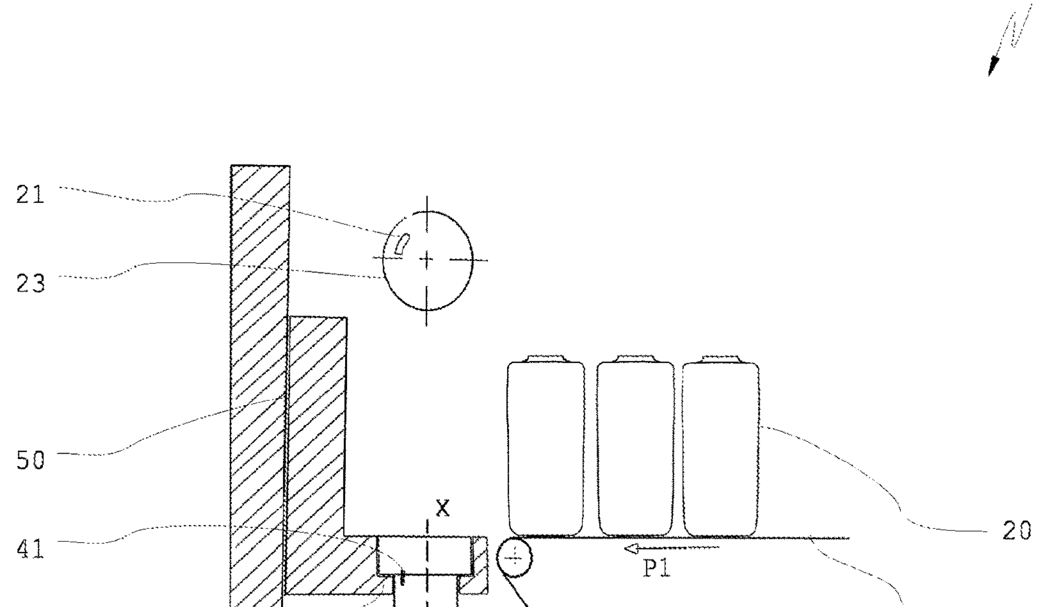

(52) U.S. Cl.
CPC .............................. *B29C 49/42101* (2022.05); *B29C 2049/2017* (2013.01); *B29C 2049/2073* (2013.01); *B29C 2049/2404* (2013.01); *B29C 2049/2443* (2013.01); *B29C 2949/26* (2022.05); *B29L 2031/712* (2013.01)

(58) Field of Classification Search
CPC ........ B29C 2949/26; B29C 2049/2073; B29C 2049/2017; B29C 49/42065; B29C 2049/2443; B29C 2049/2404; D21J 3/10; D21J 7/00; B29K 2311/10; B29K 2911/10; B29K 2711/10; B29L 2031/712; B29L 2031/7158
See application file for complete search history.

(56) References Cited

FOREIGN PATENT DOCUMENTS

| | | | |
|---|---|---|---|
| IT | 2016000128354 | A1 | 6/2018 |
| WO | 2012/139590 | A1 | 10/2012 |
| WO | 2018/167192 | A1 | 9/2018 |
| WO | 2020/070255 | A1 | 4/2020 |

OTHER PUBLICATIONS

Written Opinion corresponding to PCT/EP2022/072407 mailed Nov. 7, 2022.

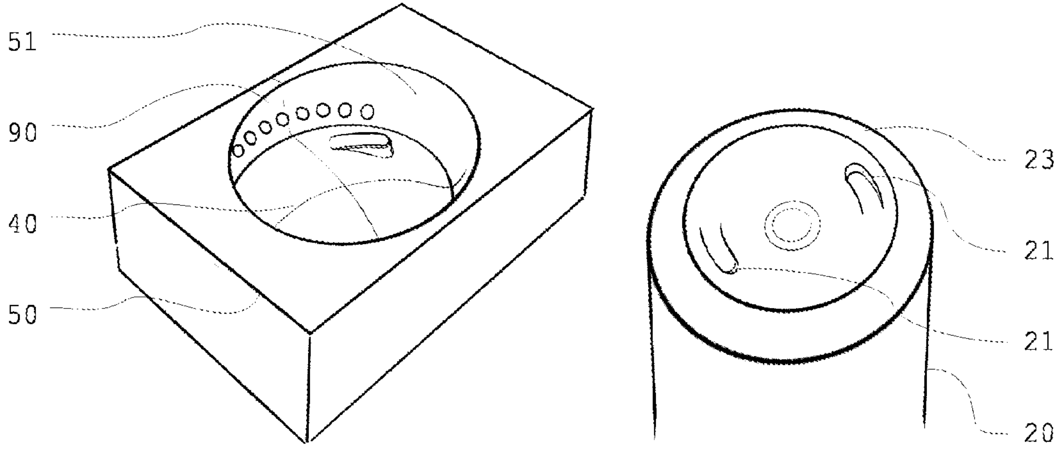
FIG: 5A
FIG. 5B
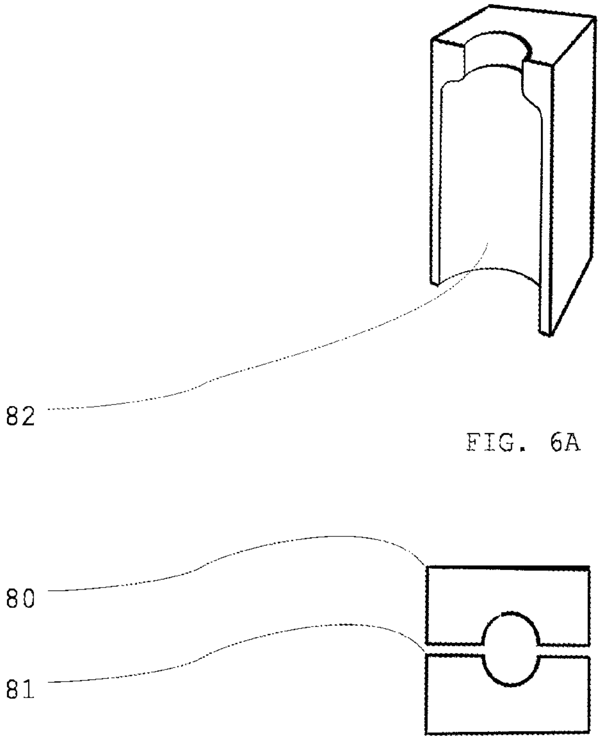
FIG. 6A
FIG. 6B

METHOD AND DEVICE FOR LOADING A FIBRE-BASED CONTAINER WITH A PREFORM AND FOR INSERTING THE CONTAINER INTO A BLOW MOLD

The present invention relates to a method for loading a fiber-based container with a preform, to a device for loading a fiber-based container with a preform and to a method for inserting a fiber-based container together with a preform arranged therein into a blow mold according to the preamble of the independent claims.

Different containers for holding liquid are known from the prior art. For example, glass bottles or plastic bottles have become popular for holding beverages. Containers which are made of fiber-based material have likewise already been proposed.

A fiber-based container was proposed in WO 2012/139590 A1. To produce this container, what is known as pulp is introduced into a two-part mold and pressed by with a flexible balloon against a corresponding wall in this mold and compressed accordingly.

The pulp is a mixture of fibers and water, in particular natural fibers such as hemp fibers, cellulose fibers or flax fibers or a mixture thereof. The pulp may have additives, as known, for example, from PCT/EP2019/076839, which, for example, improve curing of the compressed pulp or have an influence on the later appearance or generally change the properties of the pulp or of the later container.

In the case of these fiber-based containers, there is a risk of the containers softening due to liquid stored in the container and, for example, becoming leaky or of substances diffusing out of the container and into the liquid.

It has been proposed to provide such fiber-based containers with an inner layer made of plastic, in particular to arrange within the fiber-based container a plastic bottle which can assume corresponding barrier functions. The fiber-based container thus only provides a shell for a thin-walled plastic container. Such a combination has become known from WO 2018/167192 A1.

Thus, typically a fiber-based shell is provided, into which a plastic layer or a plastic lining is introduced. This typically occurs in the following manner: in a first step, the fiber-based shell is provided, and in a second step, a preform is introduced into this shell. Subsequently, this preform is inflated within the fiber-based shell until the preform touches an inner contour of the fiber-based shell or is in contact with the inner contour of the fiber-based shell. This inflation process typically takes place in a blow mold whose cavity corresponds to the outer contour of the fiber-based shell. As described in WO 2018/167192 A1, there is a risk of cracks forming in the fiber-based container. Although this has been partly reduced by the teaching of WO 2018/167192 A1, the results remain unsatisfactory.

One object of the invention is to eliminate at least one or more disadvantages of the prior art. In particular, a device and a method for loading a fiber-based container with a preform and a method for inserting this container into a blow mold are to be provided, which enable the number of defective containers to be reduced.

This object is achieved by the devices and methods defined in the independent claims. Further embodiments emerge from the dependent claims.

A method according to the invention for loading with a preform comprises the steps of:

providing a container on a rotary plate rotating the rotary plate, together with the container, into a predetermined position inserting a preform into the container.

As already mentioned, fiber-based containers are typically produced in a two-part or multi-part mold. As a result, the corresponding containers are not perfectly rotationally symmetrical but have fine ridges, for example in particular in the region of the mold parting plane or planes, which ridges can protrude in relation to the rest of the surface of the container.

By rotating the rotary plate together with the container into a predetermined position, the container can be oriented according to the predetermined position. This predetermined position can, for example, be a position which has a specific orientation relative to the orientation of a subsequent blow mold, into which the fiber-based container is introduced together with the preform. For example, a protruding ridge on the container can thus be oriented in accordance with a mold parting plane of the subsequent blow mold.

The rotary plate and the container have a common axis of rotation about which the rotary plate is rotated together with the container in order to position the container. The axis of rotation corresponds to the longitudinal axis of the container in this case. The rotary plate is a device for receiving a single container such that each individual container can be individually rotated.

Before the preform is inserted into the container, it can be heated to a higher temperature.

By increasing the temperature of the preform, it can easily be inflated in a subsequent step.

In order to insert the preform into the container, the container can be moved vertically into a transfer position.

A vertical movement can be performed using simple means since only a linear movement is necessary. In addition, the preform can be held in a corresponding position and does not have to be moved as well.

In order to move the container, a lifting device can be provided on which the container is held by its base.

By holding the container by its base, its periphery and therefore the container body and optionally a container opening adjoining it remains free and visible. A rotational position of the container can be easily checked, for example using optical sensors.

A lifting device is a simple and economical example for performing a vertical movement.

Preferably, the container is held on the lifting device by a negative pressure.

By holding the container using negative pressure, no additional elements for holding the container are required on the container. In addition, pressure points as can be created by gripping devices, for example, can be avoided.

Preferably, when the container is provided, the rotary plate is rotated until an engagement element of the rotary plate engages in a corresponding shaped element of the container.

For each container, a shaped element on the container has the same position and/or location with respect to the mold parting plane. Using a corresponding shaped element for orientation purposes thus causes the mold parting plane of the container to likewise undergo a corresponding orientation.

By rotating the rotary plate until the engagement element of the rotary plate engages in the corresponding shaped element, the rotary plate can be accordingly positioned in relation to the mold parting plane of the container.

Based on the position of the rotary plate, it is accordingly possible to infer the position of the mold parting plane of the container and to correspondingly determine said position.

By further rotating the rotary plate, the mold parting plane of the container can therefore be rotated into a predetermined position.

In so doing, the container is rotated in particular only after the engagement element is engaged in the shaped element. Accordingly, during the rotational movement of the container, said container is positioned in its position relative to the shaped element and therefore relative to the rotary plate.

By rotating the rotary plate, the container is therefore also rotated.

During the rotation of the container, said container is preferably held by a guide device at its opening and is clamped in particular between the guide device and the rotary plate.

The guide device prevents the container from unintentionally falling. In addition, the container opening can be centrally positioned by means of the guide device. The vertical movement into a transfer position can subsequently be performed without further correction.

The preform can be placed in a transfer position before being inserted into the container.

The preform can therefore be held statically in a corresponding position and only the container has to be moved relative to the preform.

After the preform has been inserted, it can be held by a gripper together with the container.

This makes it possible to easily move the preform together with the container from the transfer position and into a corresponding blow mold, into which the preform is inserted together with the container. After the container has been inserted into the blow mold together with the preform, the preform is correspondingly inflated.

The gripper can be a gripper as described in Swiss patent application CH1203/20. In particular, it relates to a gripper which presses an inner wall of the fiber-based container onto an outer surface of the preform.

The blow mold can also be designed according to the aforementioned patent application and have a top plate on which the gripper can rest.

The gripper and the top plate of the blow mold are designed in particular according to the system consisting of the gripper and top plate claimed in CH1203/20.

The gripper presses an inner wall of the fiber-based container onto an outer surface of the preform. The outer surface of the preform can be located on the neck of the preform; however, it is also possible for the outer surface to be formed on a region of a protrusion on the neck of the preform. The gripper can therefore hold the combination consisting of the preform and container both easily and securely.

Another aspect of the invention relates to a method for inserting a fiber-based container together with a preform arranged therein into a blow mold.

The method comprises the steps of:
- loading a fiber-based container, together with a preform, by means of a method as described herein,
- rotating the container into the predetermined position such that a mold parting plane on the container, created by the production of the container, is rotated into a position defined relative to the mold parting plane of the blow mold.

In this case, the position of the mold parting plane of the container corresponds to the position of the mold parting plane of the blow mold such that any ridges on the container come to lie in the mold parting plane of the blow mold. This prevents the protruding ridges from lying in a position inside the cavity of the blow mold and the container from correspondingly being deformed and/or damaged thereby.

It would be conceivable here for the blow mold to have widened portions in the region of the mold parting plane for receiving the projecting ridges of the container.

Alternatively, it could be provided that the blow mold has widened portions for receiving the projecting ridges of the container in a different position to the mold parting plane. In this case, the container would be rotated into a predetermined position which is oriented in accordance with these recesses so that, when the blow mold is loaded with the container, the protruding ridges come to lie on or in the corresponding recesses.

Preferably, the container together with the preform is inserted into a cavity of the blow mold by a gripper from a transfer position.

This ensures that a relative position of the container and the preform relative to the blow mold does not change, or only changes to a predetermined extent.

In this case, the gripper is designed so as to press an inner wall of the fiber-based container onto an outer surface of the preform while gripping and therefore holds the preform and container together.

Another aspect of the invention relates to a device for loading a fiber-based container with a preform in a predetermined position. The device has a rotary plate for rotating a container arranged thereon into the predetermined position.

By means of such a device comprising a rotary plate, the rotational position of a container can be correspondingly easily changed.

At least one engagement element can be arranged on the rotary plate in this case. This is suitable for engaging in a substantially corresponding shaped element of the container so that the container can be rotated together with the rotary plate.

By means of the engagement of an engagement element in the shaped element, the container can be rotated together with the rotary plate. A relative position or location of the rotary plate with respect to the container is maintained. Accordingly, a position of the container can be inferred from the position of the rotary plate.

The device can have at least one lifting device with which the container can be moved in a vertical direction.

This allows the container to be easily displaced into a transfer position in which a preform can be inserted into the container.

The lifting device can have a support element on which a base of the container can be placed. The support element is in particular substantially complementary to the design of at least a portion of the base of the container.

By means of the support element, the container can be placed on the lifting device in a reproducible manner. This makes it possible for all containers to have the same position on the lifting device.

A defined interface between the base of the container and the support element can be created by at least a portion of the base having a substantially complementary design such that the container can be accurately positioned on the support element.

The support element can in particular be substantially annular and enclose the rotary plate. The support element is in particular vertically displaceable relative to the rotary plate.

As a result of the annular design of the support element, the rotary plate can be arranged inside the support element. In this embodiment, said rotary place can be rotated and turned independently of the support element. Due to the displaceability of the support element relative to the rotary plate, the support element or a container arranged thereon can be lifted off the rotary plate.

This allows for the simple vertical movement of the container into a transfer position without the rotary plate having to also be moved. The corresponding apparatuses for moving the rotary plate can remain stationary.

The annular design of the support element means it can receive a corresponding base of the container irrespective of its primary position with respect to its axis of rotation.

The lifting device can have an apparatus for generating a negative pressure so that a container arranged on the lifting device is held on the lifting device by means of negative pressure.

The device for generating a negative pressure is designed in particular as a component of the support element.

The container can be held by the device for generating a negative pressure without additional elements for holding the container being necessary. In addition, pressure points as can be created by gripping devices, for example, can be avoided.

On account of the device being designed as a component of the support element, the container can be securely held on the support element.

The device for generating the negative pressure has corresponding openings, in particular in the region of the complementary design of the support element.

The negative pressure can thus be generated in the regions in which only slight tolerances exist between the support element and the container. This increases the efficiency of the device for generating the negative pressure.

A guide device on the device makes it possible to secure the container against falling or tipping as it is rotated. In addition, it is possible to center the container and in particular its container opening.

The device can have a gripper for inserting the container together with the preform into a blow mold from a transfer position.

In this case, the gripper can be designed so as to press an inner wall of the fiber-based container onto an outer surface of the preform while gripping, and accordingly hold the preform and container together.

Such a gripper allows the container and the preform to be fixed relative to one another and in particular for the container to maintain a relative position to the device and therefore subsequently also relative to the blow mold, or for example to change by a predetermined amount.

The device can also have a first conveyor belt for providing containers. As a result, the containers which are to be loaded can be supplied to the device uniformly and in a recurring position.

Figure 2:
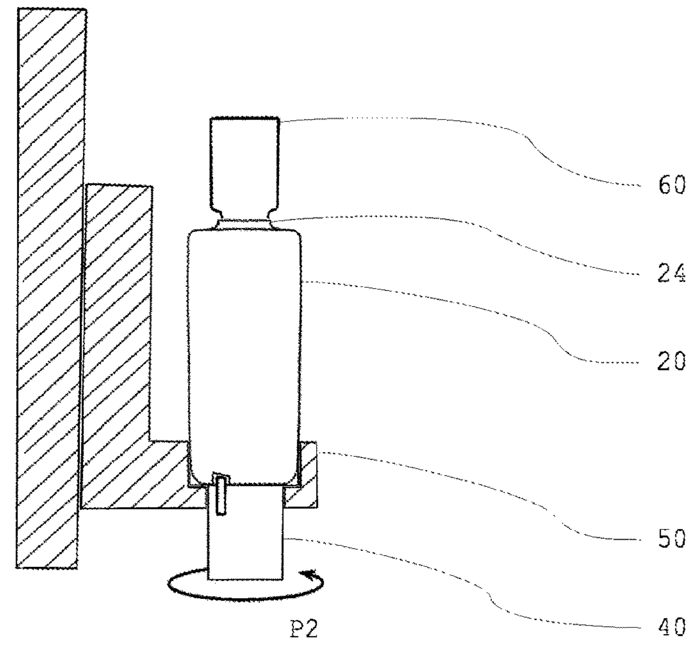
Figure 3:
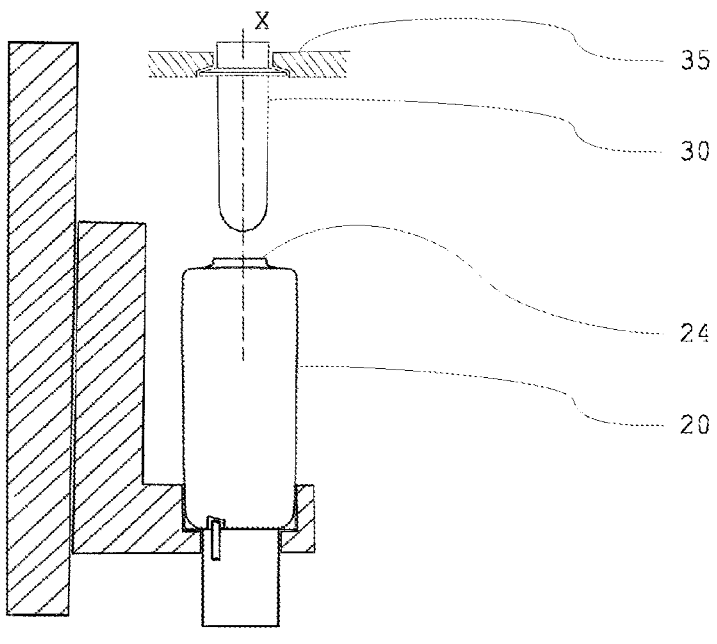
Figure 4:
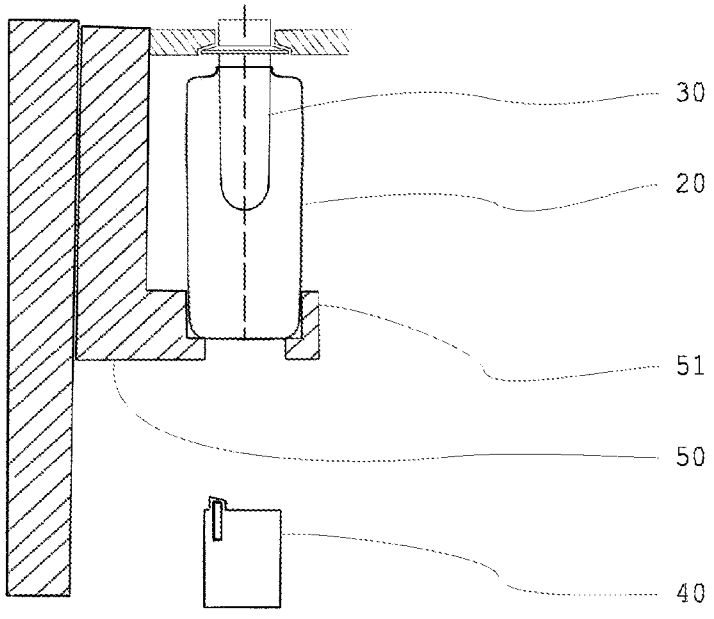

Various aspects of the invention will be described by way of example with reference to schematic drawings. These show:

FIG. 1: a schematic view of a device for loading a fiber-based container;

FIG. 2: a first method step on the basis of a detailed view from FIG. 1;

FIG. 3: another method step;

FIG. 4: another method step;

FIG. 5A, 5B: a view of a lifting device together with an associated base of a container;

FIG. 6A, 6B: a blow mold; and

Figure 7:
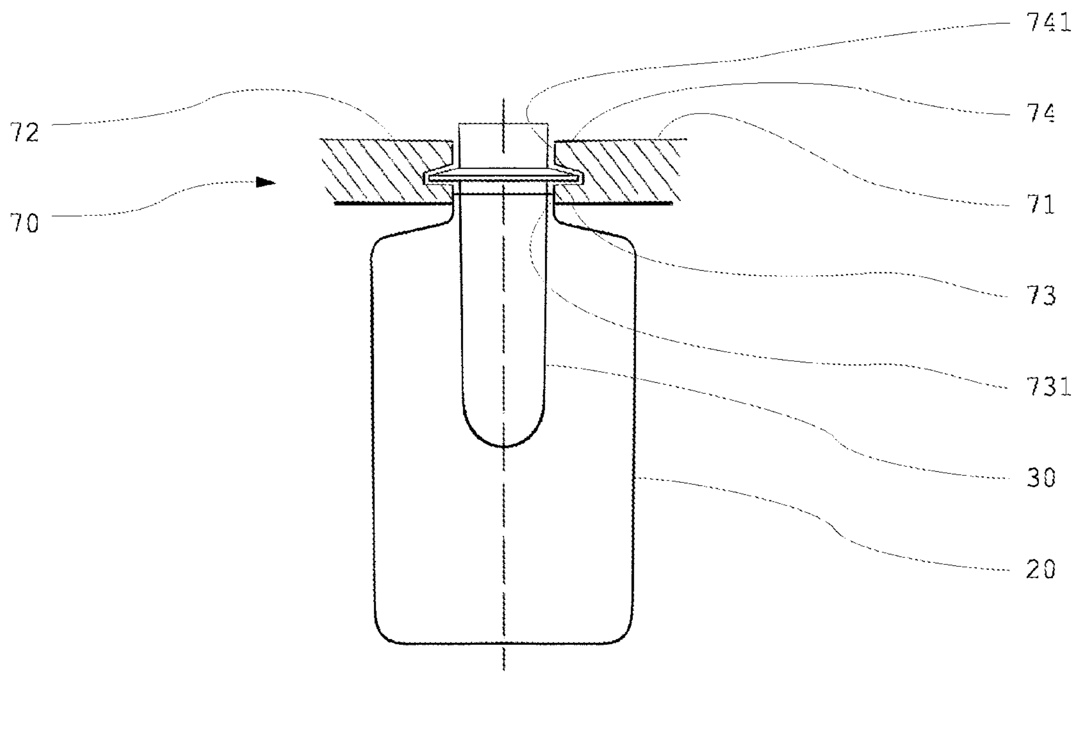

FIG. 7: a container comprising a preform in a gripper.

FIG. 1 is a schematic view of a device 100 for loading a fiber-based container 20. The device 100 has a conveyor belt 101 on which containers 20 are arranged that are supplied. The device 100 also has a lifting device 50 having a support element 51 arranged thereon and a rotary plate 40. The lifting device 50 and, in this case, the support element 51 enclose the rotary plate 40 in the shape of a circular ring. An engagement element 41 is arranged on the rotary plate 40 for engagement in a substantially complementary shaped element 21 which is arranged on the base 23 of a container 20. For the sake of simplicity, a bottom view of the base 23 of the container 20 is shown above the rotary plate 40 in FIG. 1.

The containers 20 are moved by means of the conveyor belt in the direction of the arrow P1. The rotary plate 40 can be rotated about its axis of rotation X and is accordingly rotatable about its axis of rotation X. This is illustrated by the arrow P2.

In order to load the lifting device 50, the conveyor belt is moved in the direction of the arrow P1 such that a first container 20 is placed on the rotary plate 40 and accordingly on the support element 51.

FIG. 2 shows a first method step based on a detailed view from FIG. 1. After placing the container 20 on the support element 51 (see FIG. 5A), a guide device 60 is introduced into the opening 24 in the container 20 and the container 20 is centered in relation to the axis of rotation X. For this purpose, the guide device 60 is moved in the direction of the rotary plate 40 into the opening 24 in the container 20.

Subsequently, the rotary plate 40 is rotated in the direction of the arrow P2 until the engagement element 41 is operatively connected to the shaped element 21 on the base 23 of the container 20. As soon as this contact is established, the rotary plate 40 is moved further until it assumes a predetermined position. This position corresponds to a relative position in relation to a mold parting plane of the blow mold (see FIG. 6 in this regard), in which the container 20 is later placed. In accordance with the position of the rotary plate 40, the container 20 therefore also has a relative position that is determined in relation to the subsequent blow mold.

As soon as the container 20 is thus positioned in the predetermined position, an apparatus 90 for generating negative pressure (see FIG. 5 in this regard) is activated, and the container 20 is thereby held on the support element 51.

Subsequently, the guide device 60 is removed from the opening 24 in the container 20 again so that this opening 24 is freely accessible.

FIG. 3 shows another method step. Subsequent to the positioning of the container 20, as described in relation to FIG. 2, a preform 30 is moved above the container 20 into the transfer position shown here by a gripping device 35. As can be seen from the view according to FIG. 3, the container 20 and the preform 30 are aligned and arranged one above the other along the axis X so that the preform 30 is arranged centrally with respect to the opening 24. The gripping device 35 only holds the preform 30 above a support ring, which is not described here in greater detail, so that the container 20 can be arranged underneath the support ring on the preform 30.

FIG. 4 shows another method step after providing the preform 30 in the transfer position. In this step, the lifting device 50 has been moved vertically upward so that the container 20 is likewise located in the transfer position. The container 20 has been moved by sliding vertically over the provided preform 30 so that the preform 30 extends through the opening 24 and into the container 20.

It can be seen that the lifting device 50 has been moved in the vertical direction independently of the rotary plate 40.

Subsequently, the gripper 35 is released and moved away, and the preform is held together with the container 20 by another gripper 70 so that the preform 30 can be inserted into a corresponding blow mold 80 together with the container 20. A corresponding gripper is described in relation to FIG. 7.

FIGS. 5A and 5B show a view of a lifting device 50 and a rotary plate 40 (FIG. 5A) together with an associated base 23 of a container 20 (FIG. 5B). The support element 51 is arranged on the lifting device 50. A plurality of openings, which provide part of the apparatus 90 for generating a negative pressure, can be seen on the support element 51. The surface of the support element 51 visible here is substantially complementary to a corresponding surface of the base 23 of the container 20. The base of the container 23 can be seen in FIG. 5B. In the present case, two shaped elements 21 are arranged on the base 23 and lie diametrically opposite one another in relation to a longitudinal axis of the container. The mold parting plane of the container 20 and the associated ridges are not shown in greater detail.

FIGS. 6A and 6B show a blow mold 80 in a plan view (FIG. 6A) and in a sectional view along the mold parting plane 81 so that only one half of the blow mold is visible (FIG. 6B). The blow mold 80 has two blow mold halves, not described in greater detail, which together provide a cavity 82. The mold parting plane 81 extends between the two blow mold halves.

FIG. 7 shows a container 20 comprising a preform 30 in a gripper 70. By means of the gripper 70, the container 20 is transferred together with the preform 30 into the blow mold 80. The gripper 70 has two legs 71 and 72. Only the leg 71 is described below. However, the statements also apply to the leg 72. The leg 71 has a first gripping jaw 73 and a second gripping jaw 74. A gripping surface 731 is arranged on the first gripping jaw 73 and a gripping surface 741 is arranged on the second gripping jaw 74. The gripping surfaces 741 and 731 each extend along a circular ring through an angle of 30°. The first gripping jaw 73 is axially spaced apart from the second gripping jaw 74. In cross section, the first gripping jaw 73 forms a substantially C-shaped cross section together with the second gripping jaw 74. This C-shaped cross section is designed to receive a corresponding support ring. The first gripping jaw 73 is offset radially outwards in relation to the second gripping jaw 74.

Contours can be formed in particular on the gripping surface 731 of the first gripping jaw 73, which contours improve the friction between this gripping surface 731 and a fiber-based shell 20 to be gripped.

The invention claimed is:

1. A method for loading a fiber-based container (20) with a preform (30), comprising the steps of:

providing a container (20) on a rotary plate (40)

rotating the rotary plate (40) together with the container (20) into a predetermined position;

inserting a preform (30) into the container (20), wherein the container (20) is moved vertically into a transfer position in order to insert the preform (30) into the container (20).

2. The method according to claim 1, wherein the preform (30) is heated to a higher temperature before being inserted into the container (20).

3. The method according to claim 1, wherein a lifting device (50) is provided for moving the container (20), on which lifting device the container (20) is held by its base (23).

4. The method according to claim 3, wherein the container (20) is held on the lifting device (50) by means of a negative pressure.

5. The method according to claim 1, wherein the rotary plate (40) is rotated when providing the container (20) until an engagement element (41) of the rotary plate (40) engages in a corresponding shaped element (21) of the container (20).

6. The method according to claim 5, wherein the container (20) is only rotated after the engagement element (41) is engaged in the shaped element (21).

7. The method according to claim 1, wherein during the rotational movement of the container (20), said container is held by a guide device (60) at its opening and is clamped in particular between the guide device (60) and the rotary plate (40).

8. The method according to claim 1, wherein the preform (30) is placed in a transfer position before being inserted into the container (20).

9. The method according to claim 1, wherein, after the preform (30) has been inserted into the container (20), the container (20) is held, together with the preform (30), by a gripper (70).

10. A method for inserting a fiber-based container (20) together with a preform (30) arranged therein into a blow mold (80), said method comprising the steps of:

providing a container (20) on a rotary plate (40)

rotating the rotary plate (40) together with the container (20) into a predetermined position:

inserting a preform (30) into the container (20), rotating the container (20) into the predetermined position such that a mold parting plane (22) on the container (20), created by the production of the container (20), is rotated into a position defined relative to a mold parting plane (81) of the blow mold (80).

11. The method according to claim 10, wherein the container (20) together with the preform (30) is inserted into a cavity (82) of the blow mold (80) by a gripper (70) from a transfer position.

12. A device (100) for loading a fiber-based container (20) together with a preform (30) in a predetermined position, wherein the device (100) has a rotary plate (40) for rotating a container (20) arranged thereon into the predetermined position, wherein the rotary plate (40) is a device for receiving a single container (20) such that each individual container (20) can be individually rotated.

13. The device (100) according to claim 12, wherein at least one engagement element (41) is arranged on the rotary plate (40), said engagement element being suitable for engaging in a substantially corresponding shaped element (21) of the container (20) such that the container (20) can be rotated together with the rotary plate (40).

14. The device (100) according to claim 12, wherein the device (100) has at least one lifting device (50) with which the container (20) can be moved in a vertical direction.

15. The device (100) according to claim 14, wherein the lifting device has a support element (51) on which a base (23) of the container (20) can be placed, the support element (51) in particular being substantially complementary to a design of at least a portion of the base (23) of the container (20).

16. The device (100) according to claim 15, wherein the support element (51) is substantially annular and encloses the rotary plate (40) and, in particular, is vertically displaceable relative to the rotary plate (40).

17. The device (100) according to claim 14, wherein the lifting device (50) has an apparatus (90) for generating a negative pressure such that a container (20) arranged on the lifting device (50) is held on the lifting device (50) by means of negative pressure.

18. The device (100) according to claim 12, wherein the device (100) has a guide device (60) for guiding and supporting the container (20) during rotation.

19. The device (100) according to claim 12, wherein the device (100) has a gripper (70) for inserting the container (20), together with the preform (30), into a blow mold (80) from a transfer position.

20. The device (100) according to claim 12, wherein the device (100) has a first conveyor belt (101) for providing containers (20).

* * * * *